United States Patent [19]

Fresch et al.

[11] Patent Number: 4,918,939
[45] Date of Patent: Apr. 24, 1990

[54] SELF-CONTAINED AIR DRYING UNIT

[75] Inventors: Vincent P. Fresch, Elm Grove; Titus Mathews, Kenosha; Anthony R. Rossi, Brookfield, all of Wis.

[73] Assignee: Pneumatech, Inc., Kenosha, Wis.

[21] Appl. No.: 295,482

[22] Filed: Jan. 10, 1989

[51] Int. Cl.⁵ .............................................. F25D 21/00
[52] U.S. Cl. ........................................... 62/272; 62/93; 62/95; 165/140
[58] Field of Search .................. 62/93, 95, 272, 275; 165/140

[56] References Cited

U.S. PATENT DOCUMENTS

| | | | |
|---|---|---|---|
| 3,165,903 | 1/1965 | Roc et al. | 62/95 X |
| 4,253,315 | 3/1981 | Fiedler | 62/93 X |
| 4,651,816 | 3/1987 | Struss et al. | 165/140 X |

Primary Examiner—Henry A. Bennet
Assistant Examiner—John Sollecito
Attorney, Agent, or Firm—Andrus, Sceales, Starke & Sawall

[57] ABSTRACT

An improved self-contained air drying unit utilizes a single fan to draw air across an aftercooler, a condenser and a reheater, all of which are located within a single housing.

3 Claims, 1 Drawing Sheet

SELF-CONTAINED AIR DRYING UNIT

BACKGROUND OF THE INVENTION

The present invention relates to an apparatus for drying air and more specifically to a self-contained air drying unit in which all the operational components typical of an air drying system are located and contained within a single unit.

Many industrial applications require the use of extremely clean and dry air. Pneumatic tools, robotics and paint sprayers are but three of the many instances in which industry requires extremely dry air for use in a compressed air system.

While air drying systems are available for industrial use, the typical industrial systems are extremely large and expensive and do not lend themselves to small shop applications.

The small air drying equipment that is available utilizes a number of components that are separately packaged and must be interconnected in order to provide an operable system.

It is the object of the present invention to provide a small, compact air drying unit in which all the necessary components are located within a single cabinet.

SUMMARY OF THE INVENTION

An improved self-contained air drying unit of the type in which heated air from a compressor is cooled and dryed in a heat exchanging evaporator includes an aftercooler disposed within the unit for reducing the temperature of the air prior to its introduction into the heat exchanging evaporator.

In accordance with another aspect of the invention the unit is provided with a condenser disposed substantially adjacent the aftercooler for cooling the compressed refrigerant gas and producing liquid refrigerant.

In accordance with yet another aspect of the invention, the unit is provided with a fan that is disposed within the unit and which draws ambient air across both the aftercooler and the condenser.

In accordance with still another aspect of the invention, the air drying unit is provided with a reheater for raising the temperature of the air exiting the heat exchanging evaporator and the reheater is located substantially adjacent to the aftercooler and the condenser so that the single fan can draw air across all three components.

The present invention thus provides a compact, inexpensive air drying unit in which all the operational components are located within a single cabinet.

BRIEF DESCRIPTION OF THE DRAWINGS

The drawings illustrate the best mode presently contemplated of carrying out the invention.

In the drawings.

DESCRIPTION OF THE PREFERRED EMBODIMENT

Figure 1:
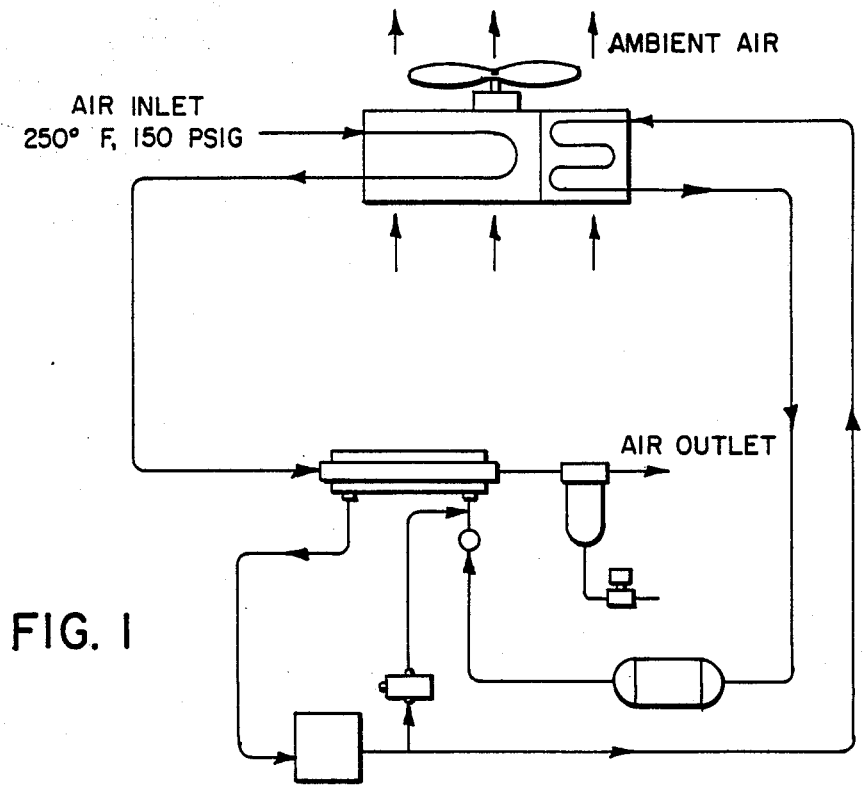
FIG. 1 is a schematic representation of an improved self-contained air drying unit constructed according to the present invention.

As shown in FIG. 1 an improved self-contained air drying unit 10 receives compressed and heated air from an air compressor (not shown) via an air inlet 12. Air inlet 12 is located on the exterior of a cabinet (not shown) which contains all of the working components described hereafter.

The compressed hot air is introduced into an aftercooler 14 which consists of a serpentine length of copper tubing across which ambient air is drawn by means of fan 16. The compressed hot air exits aftercooler 14 at a temperature within approximately 10 to 15 degrees of the ambient temperature. This precooled air is then introduced into heat exchanging evaporator 18. Evaporator 18 is provided with liquid refrigerant that is supplied by condenser 20 and proceeds through a filter dryer 22 and a metering device 24. Filter dryer 22 may be of the type marketed by Midwest Component under Model No. RTR-10X and metering device 24 may be of the type marketed by J. B. Industries under Model No. TC-50-100. The liquid refrigerant is allowed to evaporate in evaporator 18 thus reducing the temperature of the air within it. Cold dry air exits the evaporator at approximately 38 degrees fahrenheit and the condensed moisture in the air is separated at separator 26 and dry air exits the unit at air outlet 28 on the exterior of the cabinet. Separator 26 may be of the type marketed by Parker under Model No. 07F3B00012.

As is typical with systems of this type the evaporated refrigerant gas is removed from the evaporator 18 and introduced to a compressor 30 such as an Aspera-GPD LTD Model No. E6170A. The compressed refrigerant gas is then transferred to condenser 20 where it is cooled so as to provide liquid refrigerant. Condenser 20 is located substantially adjacent aftercooler 14 so that a single fan 16 can be utilized to draw ambient air across both aftercooler 14 and condenser 20.

The system is also provided with a hot gas bypass valve 32 such as a Sporlan Model No. AJE 1¼ which will divert a portion of the compressed hot refrigerant gas to the evaporator to avoid a freezing condition within the evaporator.

Figure 2:
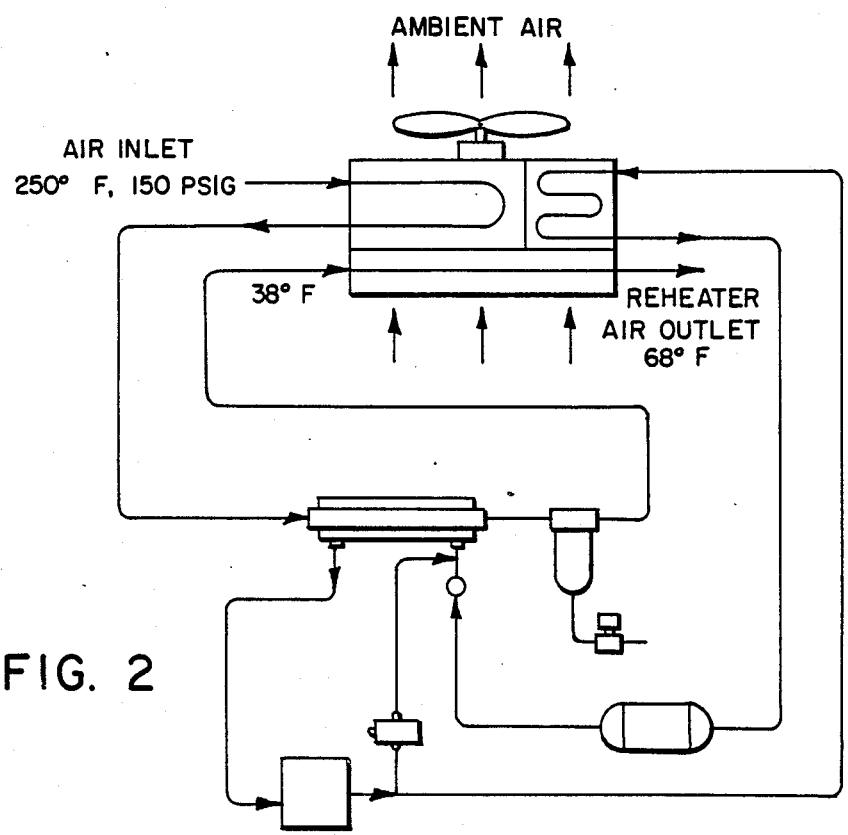
FIG. 2 is a schematic representation of an alternate embodiment of the air drying unit of FIG. 1.

FIG. 2 illustrates an improved self-contained air drying unit of the type similar to that shown in FIG. 1, but with the addition of a reheater 34. In some instances it is necessary to heat the dry air exiting evaporator 18 and thus, unit 10 shown on FIG. 2 is provided with reheater 34 located substantially adjacent and below aftercooler 14 and condenser 20. Air enters the reheater at approximately 38 degrees fahrenheit and fan 16 draws ambient air across the reheater coils so that the air exiting reheater 34 is at a temperature of approximately 68 degrees fahrenheit. The location of reheater 34 adjacent and below aftercooler 14 and condenser 20 is particularly advantageous in that ambient air drawn across these units by fan 16 will first encounter reheater 34, cooling the ambient air, and this cooled ambient air will then encounter aftercooler 14 and condenser 20. Thus, a single fan 16 may be used to provide all of the circulating air needed whether it be for heating or cooling.

Various modes of carrying out the invention are contemplated as being within the scope of the following claims, particularly pointing out and distinctly claiming the subject matter which is regarded as the invention.

We claim:

1. An improved self-contained air drying unit of the type in which heated air from a compressor is introduced into the unit and cooled and dried in a heat exchanging evaporator which has been supplied with liquid refrigerant, wherein the improvement comprises:

aftercooler means disposed within the unit for reducing the temperature of the air prior to its introduction into the heat exchanging evaporator, condenser means disposed within the unit and substantially adjacent said aftercooler means for cooling the compressed refrigerant gas and producing liquid refrigerant, air circulating means disposed within the unit for generating an air current within the unit such that ambient air is drawn across both of said aftercooler means and said condenser means, and reheating means for raising the temperature of the air exiting the heat exchanging evaporator with said reheating means disposed within the unit and substantially adjacent and upstream of said aftercooler means and said condenser means so that said air circulating means first draws ambient air across said reheating means so that the ambient air is cooled prior to being drawn across said aftercooler and condenser means.

2. The improved self-contained air drying unit defined in claim 1 wherein said air circulating means comprises a fan disposed in an upper portion of the unit and drawing ambient air upwardly across said aftercooler means and said condenser means which are disposed below said fan.

3. An improved self-contained air drying unit of the type in which heated air from a compressor is introduced into the unit and cooled and dried in a heat exchanging evaporator which has been supplied with liquid refrigerant, wherein the improvement comprises:

aftercooler means disposed within the unit for reducing the temperature of the air prior to its introduction into the heat exchanging evaporator, condenser means disposed within the unit and substantially adjacent said aftercooler means for cooling the compressed refrigerant gas and producing liquid refrigerant, a fan disposed in an upper portion of the unit for generating an upwardly flowing current of ambient air across said aftercooler means and said condenser means which are disposed below said fan, and reheating means for raising the temperature of the air exiting the heat exchanging evaporator with said reheating means disposed within the unit and substantially adjacent and upstream of said aftercooler means and said condenser means so that said fan first draws ambient air upwardly across said reheating means so that ambient air is cooled prior to being drawn across said aftercooler and condenser means.

* * * * *